(12) United States Patent
Lim et al.

(10) Patent No.: US 9,118,775 B2
(45) Date of Patent: Aug. 25, 2015

(54) MOBILE TERMINAL AND METHOD OF CONTROLLING OPERATION OF THE MOBILE TERMINAL

(75) Inventors: Hyebong Lim, Seoul (KR); Sunsang So, Seoul (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 13/169,931

(22) Filed: Jun. 27, 2011

(65) Prior Publication Data
US 2012/0052905 A1 Mar. 1, 2012

(30) Foreign Application Priority Data

Aug. 24, 2010 (KR) ........................ 10-2010-0082138

(51) Int. Cl.
| | |
|---|---|
| H04M 3/00 | (2006.01) |
| H04M 1/725 | (2006.01) |
| H04W 4/12 | (2009.01) |
| G06F 3/01 | (2006.01) |
| H04L 12/58 | (2006.01) |
| H04W 8/18 | (2009.01) |
| H04M 3/537 | (2006.01) |
| A61B 5/0476 | (2006.01) |

(52) U.S. Cl.
CPC ............ H04M 1/72563 (2013.01); G06F 3/015 (2013.01); H04W 4/12 (2013.01); A61B 5/0476 (2013.01); H04L 12/587 (2013.01); H04L 12/5895 (2013.01); H04M 3/537 (2013.01); H04M 2250/12 (2013.01); H04W 8/18 (2013.01)

(58) Field of Classification Search
CPC .......... G08B 21/06; G08B 1/08; G08B 23/00; G08B 15/004; A61B 5/0002; A61B 5/02438; A61B 5/6803; A61B 5/4806; A61B 2021/0083; A61B 16/0051; A61B 5/0476; A61B 5/0533; A61B 5/6887; H04W 52/0258; H04W 52/027; H04W 88/02; H04W 8/245; H04W 8/18; H04W 4/12; G06F 3/015; H04M 1/72525; H04M 1/72522; H04M 3/537; H04M 1/72563; H04L 12/587; H04L 12/5895
USPC ........ 455/414.1, 415, 418, 419, 550.1, 556.1, 455/412.1, 412.2, 566; 379/142.01; 345/619

See application file for complete search history.

(56) References Cited

U.S. PATENT DOCUMENTS

| | | | | |
|---|---|---|---|---|
| 5,692,517 | A * | 12/1997 | Junker | 600/545 |
| 6,011,991 | A * | 1/2000 | Mardirossian | 600/544 |
| 8,005,766 | B2 * | 8/2011 | Tian et al. | 706/11 |
| 8,027,455 | B2 * | 9/2011 | Moody et al. | 379/257 |
| 8,260,350 | B2 * | 9/2012 | Jaiswal et al. | 455/556.1 |

(Continued)

FOREIGN PATENT DOCUMENTS

| | | |
|---|---|---|
| CN | 101677774 A | 3/2010 |
| EP | 1 494 190 A1 | 1/2005 |

(Continued)

*Primary Examiner* — Olumide T Ajibade Akonai
(74) *Attorney, Agent, or Firm* — Birch, Stewart, Kolasch & Birch, LLP

(57) ABSTRACT

A mobile terminal and a method of controlling the operation of the mobile terminal are provided. The method according to one embodiment includes connecting a call between the mobile terminal and a counterpart mobile terminal; preparing a brain wave sensor to determining a state of mind of a user based on brain wave measurements obtained from the user by the brain wave sensor module; and performing a control operation relevant to the call according to the determined state of mind of the user.

8 Claims, 21 Drawing Sheets

(56) References Cited

U.S. PATENT DOCUMENTS

| | | | |
|---|---|---|---|
| 2002/0082007 A1* | 6/2002 | Hoisko et al. | 455/426 |
| 2003/0003871 A1* | 1/2003 | Urso | 455/66 |
| 2004/0066932 A1 | 4/2004 | Seligmann | |
| 2005/0163302 A1* | 7/2005 | Mock et al. | 379/211.02 |
| 2006/0098027 A1* | 5/2006 | Rice et al. | 345/619 |
| 2006/0234635 A1 | 10/2006 | Riordan et al. | |
| 2007/0161403 A1* | 7/2007 | Cheng et al. | 455/557 |
| 2008/0171573 A1* | 7/2008 | Eom et al. | 455/556.2 |
| 2008/0177197 A1* | 7/2008 | Lee et al. | 600/545 |
| 2009/0002178 A1* | 1/2009 | Guday et al. | 340/573.1 |
| 2009/0112782 A1* | 4/2009 | Cross et al. | 706/45 |
| 2010/0022279 A1 | 1/2010 | Hoberg et al. | |
| 2010/0035648 A1* | 2/2010 | Huang | 455/556.1 |
| 2010/0041447 A1* | 2/2010 | Graylin | 455/575.2 |

FOREIGN PATENT DOCUMENTS

| | | |
|---|---|---|
| EP | 1 746 828 A2 | 1/2007 |
| EP | 1 796 347 A1 | 6/2007 |

\* cited by examiner

FIG. 5
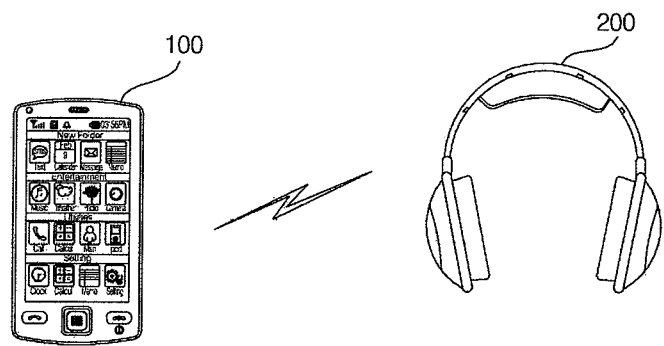
(a)
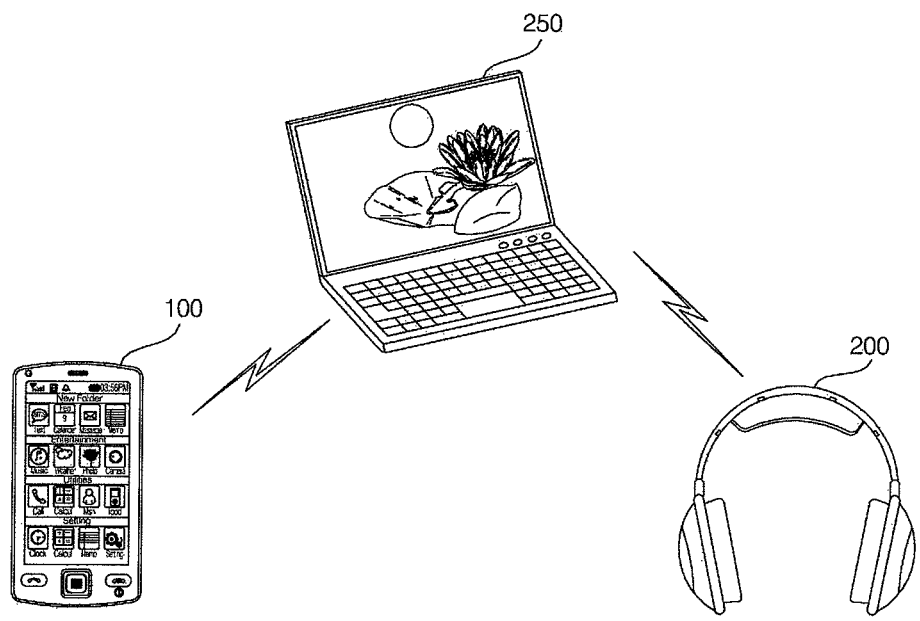
(b)

| Brainwave Type | Frquency range | Human states of mind |
|---|---|---|
| Delta | 0.1Hz to 3Hz | DEEP SLEEP |
| Theta | 4Hz to 7Hz | DROWSINESS,SHALLOW SLEEP,HIGHLY-CREATIVE STATE |
| slow Alpha | 8Hz to 9Hz | RELAXATION, MEDITATION |
| middle Alpha | 10Hz to 12Hz | STUDYING, MENTAL CONCENTRATION, HIGHTENED MEMORY, STRESS-RELIEVED |
| fast Alpha | 12Hz to 13Hz | ATTENTION, TENSION |
| Beta | 14Hz to 30Hz | NORMAL WAKING CONSCIOUSNESS |
| Gamma | 30Hz to 100Hz | UNEASINESS, EXCITEMENT |

(a)  (b)

MOBILE TERMINAL AND METHOD OF CONTROLLING OPERATION OF THE MOBILE TERMINAL

CROSS-REFERENCE TO RELATED APPLICATION

This application claims the priority benefit of Korean Patent Application No. 10-2010-0082138, filed on Aug. 24, 2010 in the Korean Intellectual Property Office, the disclosure of which is incorporated herein by reference.

BACKGROUND OF THE INVENTION

1. Field of the Invention

The present invention relates to a mobile terminal and a method of controlling the operation of the mobile terminal, and more particularly, to a mobile terminal and a method of controlling the operation of the mobile terminal, in which various operations performed by the mobile terminal can be effectively controlled according to the state of mind of a user.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals has steadily grown due to a growing tendency of considering mobile terminals as personal items that can represent personal individuality.

In the meantime, research has been conducted on various interfaces using facial expressions or motions of the human body or the eyes, and particularly, on a brain computer interface (BCI) technique, which uses brain waves to determine the intention of a user. The BCI technique has expanded its application to various fields as one of the most prominent next-generation computing techniques.

Therefore, a method is needed to determine the state of mind of a user using the BCI technique and control the operation of a mobile terminal according to the results of the determination.

SUMMARY OF THE INVENTION

The present invention provides a mobile terminal and a method of controlling the operation of the mobile terminal, in which various operations performed by the mobile terminal can be effectively controlled according to the state of mind of a user through the measurement of brain waves.

According to an aspect of the present invention, there is provided a method of controlling the operation of a mobile terminal, the method including connecting a call between the mobile terminal and a counterpart mobile terminal; preparing a brain wave sensor module and determining a state of mind of a user based on brain wave measurements obtained from the user by the brain wave sensor module; and performing a control operation relevant to the call according to the determined state of mind of the user.

According to another aspect of the present invention, there is provided a mobile terminal including a wireless communication unit configured to connect a call between the mobile terminal and a counterpart mobile terminal; a brain wave sensor module configured to measure brain waves of a user during the call; and a controller configured to determine a state of mind of a user based on the measured brain waves and perform a control operation relevant to the call according to the determined state of mind of the user.

According to another aspect of the present invention, there is provided a method of controlling the operation of a mobile terminal, the method including preparing a brain wave sensor module; determining a state of mind of a user based on brain wave measurements obtained from the user by the brain wave sensor module when a communication event occurs; and if the determined state of mind is a first state of mind, outputting no alarm signal when the determined state of mind is a first state of mind.

According to another aspect of the present invention, there is provided a mobile terminal including a brain wave sensor module configured to measure brain waves of a user; and a controller configured to determine a state of mind of a user based on the measured brain waves when a communication event occurs, wherein, if the determined state of mind is a first state of mind, the controller outputs no alarm signal.

According to another aspect of the present invention, there is provided a method of controlling the operation of a mobile terminal, the method including setting an alarm time; outputting an alarm signal upon the arrival of the alarm time; preparing a brain wave sensor module and determining a state of mind of a user based on brain wave measurements obtained from the user by the brain wave sensor module; and if the determined state of mind is a first state of mind, varying at least one of the magnitude and the type of the alarm signal.

According to another aspect of the present invention, there is provided a mobile terminal including a brain wave sensor module configured to measure brain waves of a user; and a controller configured to set an alarm time, output an alarm signal upon the arrival of the alarm time, and determine a state of mind of a user based on the measured brain waves, wherein, if the determined state of mind is a first state of mind, the controller varies at least one of the magnitude and the type of the alarm signal.

BRIEF DESCRIPTION OF THE DRAWINGS

The above and other features and advantages of the present invention will become more apparent by describing in detail preferred embodiments thereof with reference to the attached drawings in which:

FIGS. 5(*a*)-5(*b*) are diagrams illustrating how to connect the audio output device shown in FIG. 4 to the mobile terminal shown in FIG. 1 according to an embodiment of the invention;

FIG. 9 is a diagram illustrating a table showing the correspondence between brain wave frequency bands and human states of mind according to an embodiment of the invention;

FIGS. 13 through 15(b) are diagrams illustrating the exemplary embodiment of FIG. 10;

FIGS. 16(a) through 17 are diagrams illustrating the exemplary embodiment of FIG. 11;

FIGS. 19(a) through 20(b) are diagrams illustrating how to control a navigation function according to the state of mind of a user according to an embodiment of the invention;

DETAILED DESCRIPTION OF THE PREFERRED EMBODIMENTS

The embodiments of the present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
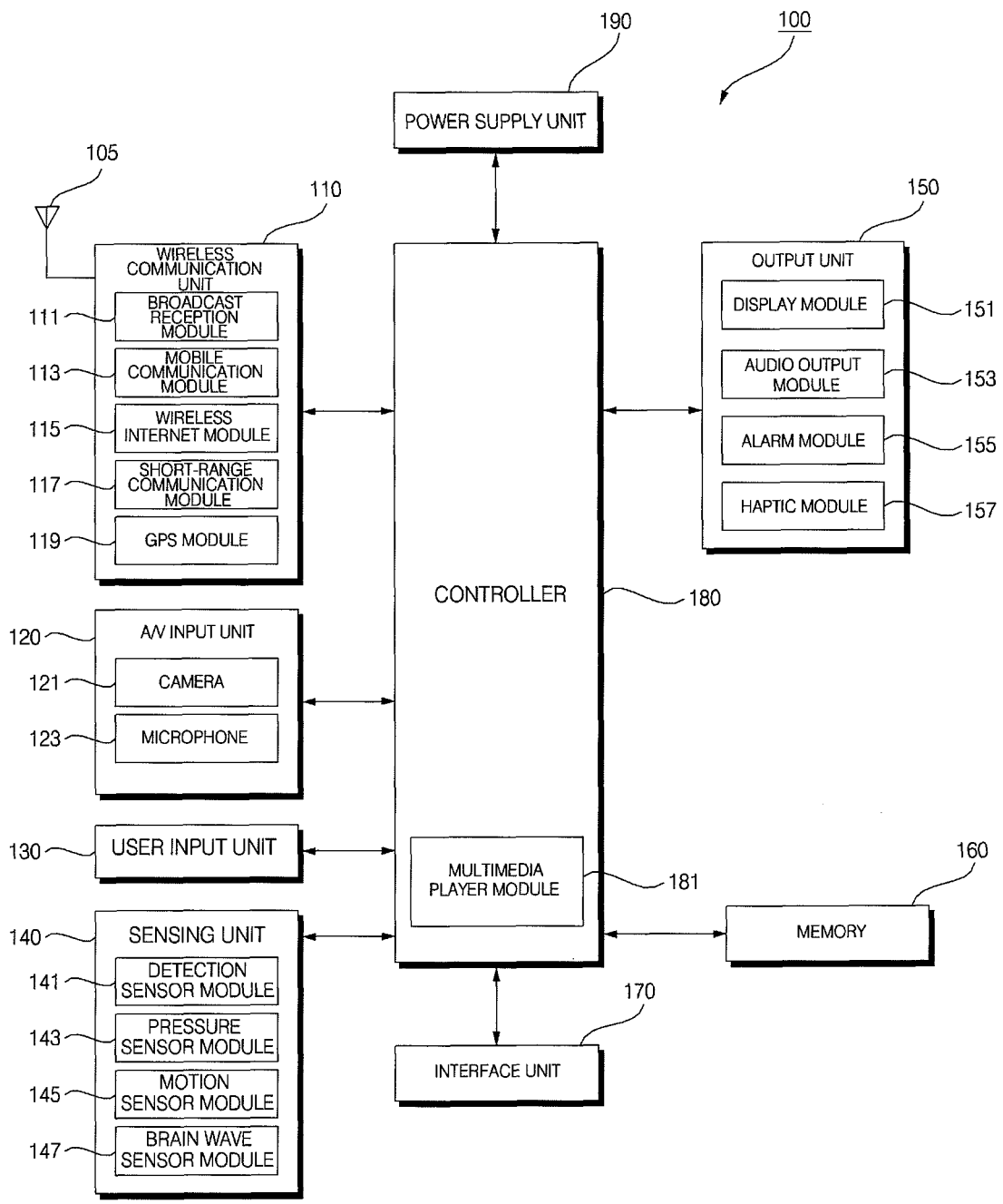
FIG. 1 is a block diagram of a mobile terminal according to an exemplary embodiment of the present invention.

FIG. 1 is a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units. All components of the mobile terminal are operatively coupled and connected.

The wireless communication unit 110 may include a broadcast reception module 111, a mobile communication module 113, a wireless interne module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160 or in another storage unit.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the Internet or another network. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include at least one camera 121 and/or at least one microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor module 141, a pressure sensor module 143, a motion sensor module 145 and a brain wave sensor module 147. The detection sensor module 141 may determine whether there is an object nearby and approaching the mobile terminal 100 without any mechanical contact with the entity. More specifically, the detection sensor module 141 may detect an object that is nearby and approaching by detecting a change in an alternating magnetic field or the rate of change of static capacitance. The sensing unit 140 may include two or more detection sensors 141.

The pressure sensor module 143 may determine whether pressure is being applied to the mobile terminal 100 or may measure the level of pressure, if any, applied to the mobile terminal 100. The pressure sensor module 143 may be installed in a certain part of the mobile terminal 100 where the detection of pressure is necessary. For example, the pressure sensor module 143 may be installed in the display module 151. In this case, it is possible to differentiate a typical touch input from a pressure touch input, which is generated using a higher pressure level than that used to generate a typical touch input, based on data provided by the pressure sensor module 143. In addition, when a pressure touch input is received through the display module 151, it is possible to determine the level of pressure applied to the display module 151 upon the detection of a pressure touch input based on data provided by the pressure sensor module 143.

The motion sensor module 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The brain wave sensor module 147 measures brain waves from the human brain using one or more brain wave sensors. Brain wave measurements may be classified into low pass filtering (LPF) data, electrocorticography (ECoG) data, and electroencephalogram (EEG) data according to which part of the brain they are obtained from. More specifically, the brain wave sensor module 147 can detect and measure an EEG signal from the scalp.

The output unit 150 can output audio signals, video signals and alarm signals. The output unit 150 can include the display module 151, an audio output module 153, an alarm module 155, and a haptic module 157.

The display module 151 can display various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a UI or a GUI for capturing or receiving images.

If the display module 151 and the user input unit 130 form a layer structure together and are thus implemented as a touch screen, the display module 151 can be used as both an output device and an input device. If the display module 151 is implemented as a touch screen, the display module 151 can also include a touch screen panel and a touch screen panel controller. The touch screen panel is a transparent panel attached onto the exterior of the mobile terminal 100 and can be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 can include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 can be implemented as e-paper by using electrostatic-charged hemispherical twist balls, using electrophoretic deposition, or using microcapsules.

The display module 151 can include at least one of a liquid crystal display (LCD), a thin film transistor (TFT)-LCD, an organic light-emitting diode (OLED), a flexible display, and a three-dimensional (3D) display. The mobile terminal 100 can include two or more display modules 151. For example, the mobile terminal 100 can include an external display module (not shown) and an internal display module (not shown).

The audio output module 153 can output audio data received by the wireless communication unit 110 during a call reception mode, a call mode, a recording mode, a voice recognition mode, or a broadcast reception mode or can output audio data present in the memory 160. In addition, the audio output module 153 can output various sound signals associated with the functions of the mobile terminal 100 such as receiving a call or a message. The audio output module 153 can include a speaker and a buzzer.

The alarm module 155 can output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 can output an alarm signal upon receiving a call signal or a message. In addition, the alarm module 155 can receive a key signal and can output an alarm signal as feedback to the key signal. Therefore, the user can be able to easily recognize the occurrence of an event based on an alarm signal output by the alarm module 155. An alarm signal for notifying the user of the occurrence of an event can be output not only by the alarm module 155 but also by the display module 151 or the audio output module 153.

The haptic module 157 can provide various haptic effects (such as vibration) that can be perceived by the user. If the haptic module 157 generates vibration as a haptic effect, the intensity and the pattern of vibration generated by the haptic module 157 can be altered in various manners. The haptic module 157 can synthesize different vibration effects and can output the result of the synthesization. Alternatively, the haptic module 157 can sequentially output different vibration effects.

The haptic module 157 can provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 can be configured to enable the user to recognize a haptic effect using the kinesthetic sense of the fingers or the arms. The mobile terminal 100 can include two or more haptic modules 157.

The memory 160 can store various programs necessary for the operation of the controller 180. In addition, the memory 160 can temporarily store various data such as a phonebook, messages, still images, or moving images.

The memory 160 can include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 can operate a web storage, which performs the functions of the memory 160 on the internet.

The interface unit 170 can interface with an external device that can be connected to the mobile terminal 100. The interface unit 170 can be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 can receive data from an external device or can be powered by an external device. The interface unit 170 can transmit data provided by an external device to other components in the mobile terminal 100 or can transmit data provided by other components in the mobile terminal 100 to an external device.

When the mobile terminal 100 is connected to an external cradle, the interface unit 170 can provide a path for supplying power from the external cradle to the mobile terminal 100 or for transmitting various signals from the external cradle to the mobile terminal 100.

The controller 180 can control the general operation of the mobile terminal 100. For example, the controller 180 can perform various control operations regarding making/receiving a voice call, transmitting/receiving data, or making/receiving a video call. The controller 180 can include a multimedia player module 181, which plays multimedia data. The multimedia player module 181 can be implemented as a hardware device and can be installed in the controller 180. Alternatively, the multimedia player module 181 can be implemented as a software program.

The power supply unit 190 can be supplied with power by an external power source or an internal power source and can supply power to the other components in the mobile terminal 100.

The mobile terminal 100 can include a wired/wireless communication system or a satellite communication system and can thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
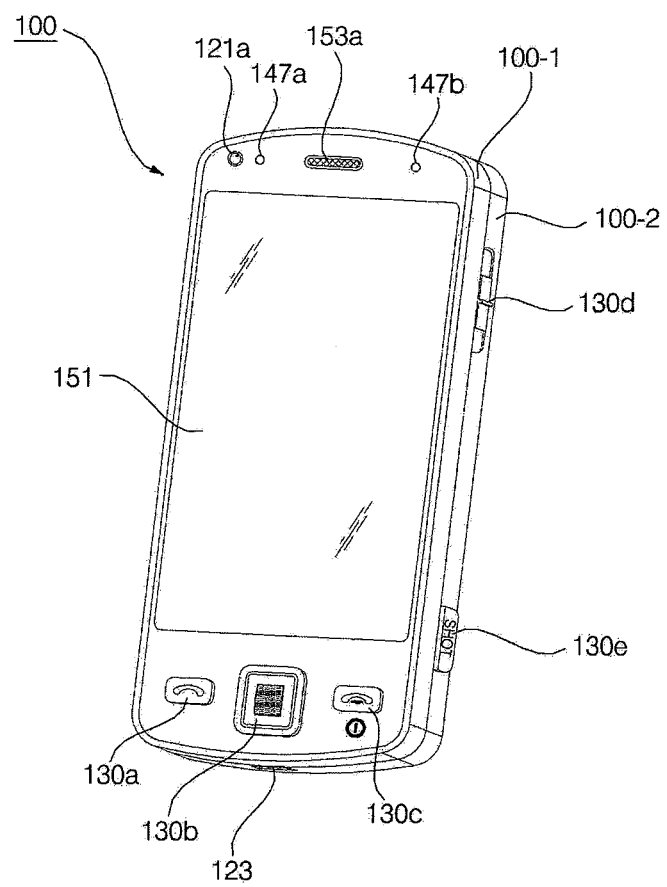
FIG. 2 is a front perspective view of the mobile terminal shown in FIG. 1.
Figure 3:
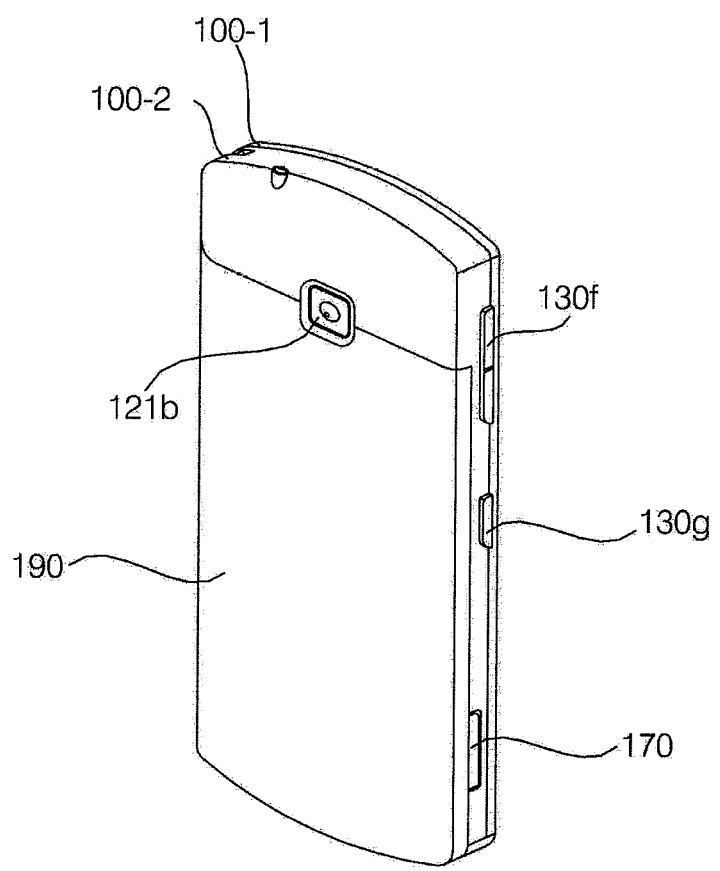
FIG. 3 is a rear perspective view of the mobile terminal shown in FIG. 2.

FIG. 2 is a front perspective view of the mobile terminal 100, and FIG. 3 is a rear perspective view of the mobile terminal 100. Referring to FIG. 2, the exterior of the mobile terminal 100 can be formed by a front case 100-1 and a rear case 100-2. Various electronic devices can be installed in the space formed by the front case 100-1 and the rear case 100-2. The front case 100-1 and the rear case 100-2 can be formed of a synthetic resin through injection molding. Alternatively, the front case 100-1 and the rear case 100-2 can be formed of a metal such as stainless steel (STS) or titanium (Ti).

The display module 151, a first audio output module 153*a*, a first camera 121*a*, first and second brain wave sensors 147*a* and 147*b* and first through third user input modules 130*a* through 130*c* can be disposed in the main body of the mobile terminal 100, and particularly, on the front case 100-1. Fourth and fifth user input modules 130*d* and 130*e* and the microphone 123 can be disposed on one side of the rear case 100-2.

If a touch pad is configured to overlap the display module 151 and thus to form a mutual layer structure, the display module 151 can serve as a touch screen. Thus, the user can enter various information to the mobile terminal 100 simply by touching the display module 151.

The first audio output module 153*a* can be implemented as a receiver or a speaker. The first camera 121*a* can be configured to be suitable for capturing a still or moving image of the user. The microphone 123 can be configured to properly receive the user's voice or other sounds.

The first and second brain wave sensors 147*a* and 147*b* can be disposed on various parts of the mobile terminal 100, other than the front case 100-1, where they can be placed in contact with the user.

The first through fifth user input modules 130*a* through 130*e* and sixth and seventh user input modules 130*f* and 130*g* (FIG. 3) can be collectively referred to as the user input unit 130, and any means can be employed as the first through seventh user input modules 130*a* through 130*g* so long as it can operate in a tactile manner. For example, the user input unit 130 can be implemented as a dome switch or a touch pad that can receive a command or information according to a pressing or a touch operation by the user, or can be implemented as a wheel or jog type for rotating a key or as a joystick. The touch can be a direct contact touch or a proximity non-contact touch, and can be made by a finger or another object. In terms of function, the first through third user input modules 130*a* through 130*c* can operate as function keys for entering a command such as start, end, or scroll, the fourth user input module 130*d* can operate as a function key for selecting an operating mode for the mobile terminal 100, and the fifth user input module 130*e* can operate as a hot key for activating a special function within the mobile terminal 100.

Referring to FIG. 3, a second camera 121*b* can be additionally provided at the rear of the rear case 100-2, and the sixth and seventh user input modules 130*f* and 130*g* and the interface unit 170 can be disposed on one side of the rear case 100-2.

The second camera 121*b* can have an image capture direction which is substantially the opposite to that of the first camera 121*a*, and can have a different resolution from that of the first camera 121*a*.

A flash and a mirror can be disposed to be adjacent to the second camera 121*b*. When an image of a subject is captured with the second camera 121*b*, the flash can illuminate the subject. The mirror can allow the user to see him- or herself when he or she wants to capture his or her own image by using the second camera 121*b*.

Another audio output module can be additionally provided on the rear case 100-2. The audio output module on the rear case 100-2 can realize a stereo function along with the audio output module 153 on the front case 100-1. The audio output module on the rear case 100-2 can also be used in a speakerphone mode.

The interface unit 170 can used as a passage allowing the mobile terminal 100 to exchange data with an external device either through a fixed line or wirelessly.

A broadcast signal reception antenna can be disposed at one side of the front or rear case 100-1 or 100-2, in addition to an antenna used for call communication. The broadcast signal reception antenna can be installed such that it can be extended from the front or rear case 100-1 or 100-2.

The power supply unit 190 can be mounted on the rear case 100-2 and can supply power to the mobile terminal 100. The power supply unit 190 can be, for example, a chargeable battery which can be detachably combined to the rear case 100-2 for being charged.

The second camera 121*b* and the other elements that have been described as being provided on the rear case 100-2 can be provided on the front case 100-1. In addition, the first camera 121*a* can be configured to be rotatable and thus to allow image capturing in various directions. In this case, the second camera 121*b* can be optional.

Figure 4:
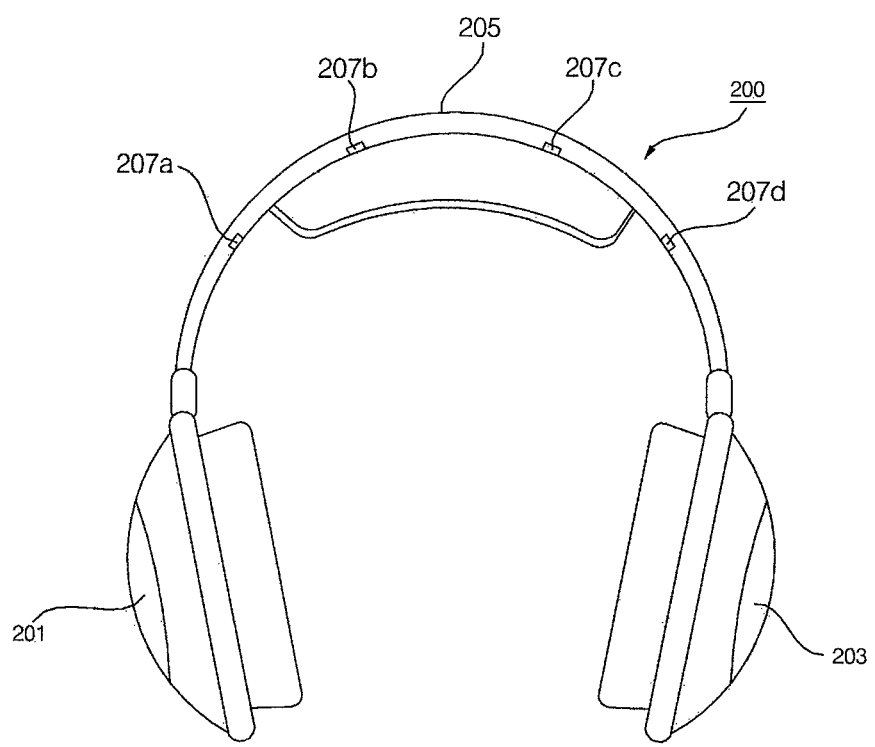
FIG. 4 is a diagram illustrating an audio output device according to an embodiment of the invention that can be connected to the mobile terminal shown in FIG. 1.

FIG. 4 illustrates an audio output device 200 according to an embodiment that can be connected to the mobile terminal 100, and FIGS. 5(*a*)-5(*b*) illustrate how to connect the audio output device 200 to the mobile terminal 100. Referring to FIG. 4, the audio output device 200 includes first and second audio output units 201 and 203 and a frame 205 connecting the first and second audio output units 201 and 203. The audio output device 200 can be worn on the head of a user. Other types of audio output devices can also be used.

The audio output device 200 can be connected to the mobile terminal 100 via wires or via short-range communication such as Bluetooth. Thus, the audio output device 200 can receive audio/video (A/V) data from the mobile terminal 100 and can then output audio signals corresponding to the A/V data directly to the ears of the user.

One or more brain wave sensors 207*a* through 207*d* can be disposed in the frame 205 of the audio output device 200, and can measure brain waves from the scalp of the user. Brain wave measurements obtained by the audio output device 200 can be subject to signal processing, and can then be wirelessly transmitted to the mobile terminal 100 either directly, as shown in FIG. 5(*a*), or via another device 250, as shown in FIG. 5(*b*). Optionally, a wired connection can be used.

The brain waves of the user can be measured by the audio output device 200 (such as a headset or earphones) or the brain wave sensor module 147 of the mobile terminal 100.

Figure 6:
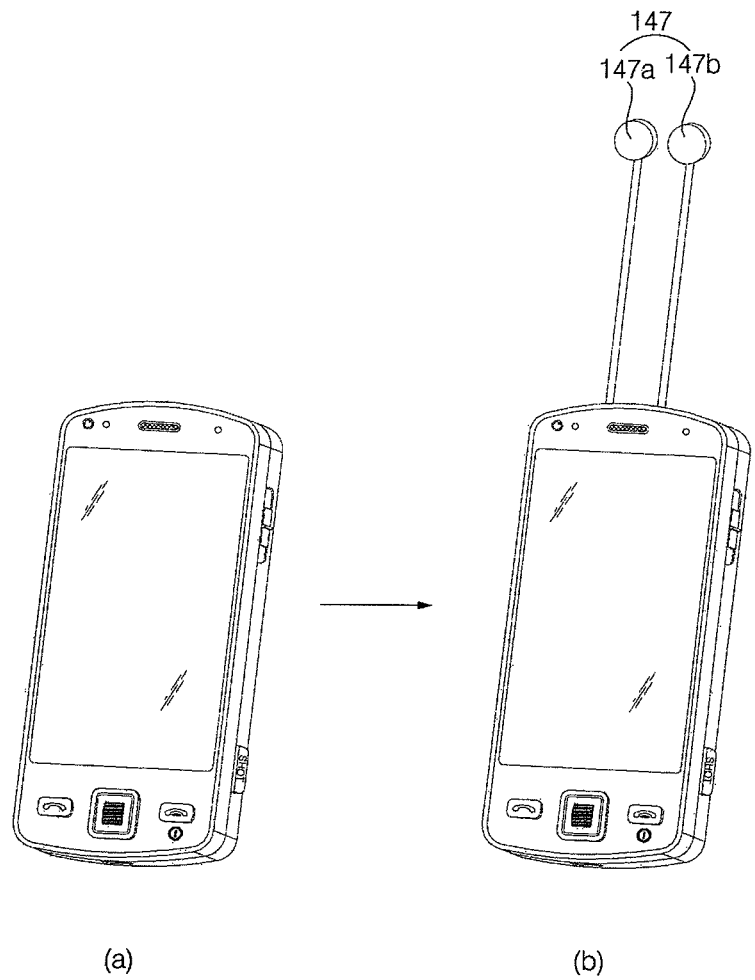
FIGS. 6(a)-6(b) and 7 are diagrams illustrating the arrangement of a brain wave sensor module according to an embodiment of the invention in the mobile terminal shown in FIG. 1.

FIGS. 6(*a*)-6(*b*) illustrate an example of the arrangement of the brain wave sensor module 147 in the mobile terminal 100, according to an embodiment of the invention. Referring to FIGS. 6(*a*)-6(*b*), the brain wave sensor module 147 can be disposed at a location where it can be placed in contact with a user. More specifically, the brain wave sensor module 147 can be retracted and extended from the mobile terminal 100 during the use of the mobile terminal 100. The brain sensor module 147 is illustrated in FIGS. 6(*a*)-6(*b*) as having two brain wave sensors (i.e., 147*a* and 147*b*), but the present invention is not restricted to this. That is, the brain sensor module 147 can include less than or more than two brain sensors and can be attachable and detachable to and from the mobile terminal 100.

Figure 7:
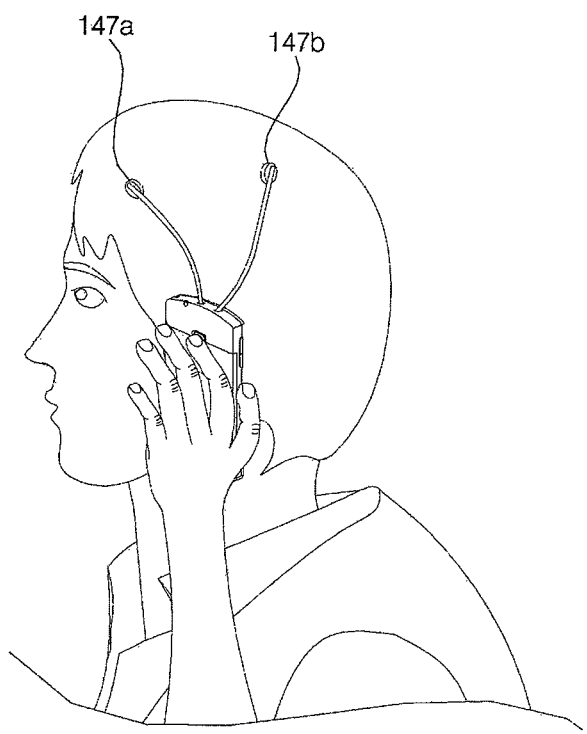

Referring to FIG. 7, the brain waves of a user can be measured by retracting and extending the brain wave sensors 147*a* and 147*b* from the mobile terminal 100 and appropriately bending the brain wave sensors 147*a* and 147*b* to be properly attached onto the head of the user.

Alternatively, one or more wireless brain wave sensors can be attached to a hair accessory or glasses or otherwise placed on or near the head of the user. When worn on the head or the face of the user, the wireless brain sensor modules will detect the brain waves of the user, will process the results of the detection, and will transmit multi-channel EEG signals obtained by the processing to the mobile terminal 100 either directly or via another device.

Figure 8:
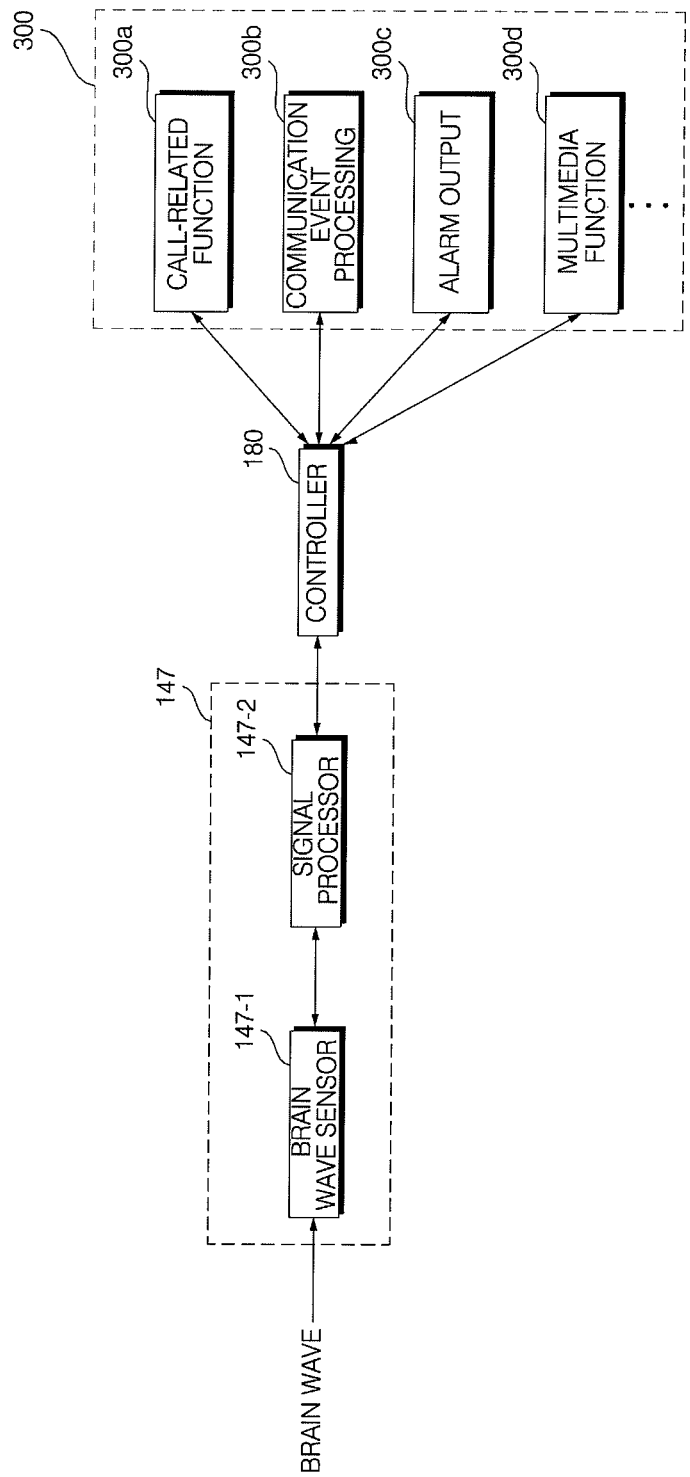
FIG. 8 is a diagram illustrating the operation of the mobile terminal shown in FIG. 1 according to an embodiment of the invention.

FIG. 8 illustrates the operation of the mobile terminal 100 according to an embodiment of the invention, and FIG. 9 illustrates an example of a table showing the correspondence between brain wave frequency bands and human states of mind according to an embodiment of the invention. Referring to FIG. 8, the brain wave sensor module 147 can include a brain wave sensor 147-1 and a signal processor 147-2. The brain wave sensor 147-1 measures brain waves from the scalp of a user, and the signal processor 147-2 converts the measured brain waves from a time domain to a frequency domain, and thus determines the frequency band that the measured brain waves belong to.

Brain wave signals obtained by the conversion performed by the signal processor 147-2 are transmitted to the controller 180. Then, the controller 180 can determine the state of mind of the user based on the brain wave signals and the table shown in FIG. 9. Brain waves resulting from the electrical activities of neurons in the cerebral cortex are largely classified into delta, theta, alpha, beta and gamma waves. Once the type of brain waves measured from the user is determined through the analysis of the frequency band of the measured brain waves, the state of mind of the user can be determined by the mobile terminal 100 based on the type of the measured brain waves.

Once the state of mind of the user is determined, the controller 180 can control various functions 300 performed by the mobile terminal 100 according to the determined state of mind of the user. The various functions 300 include, but are not limited to, a call-related function 300*a*, a communication event processing function 300*b*, an alarm output function 300*c*, and a multimedia function 300*d*.

Figure 10:
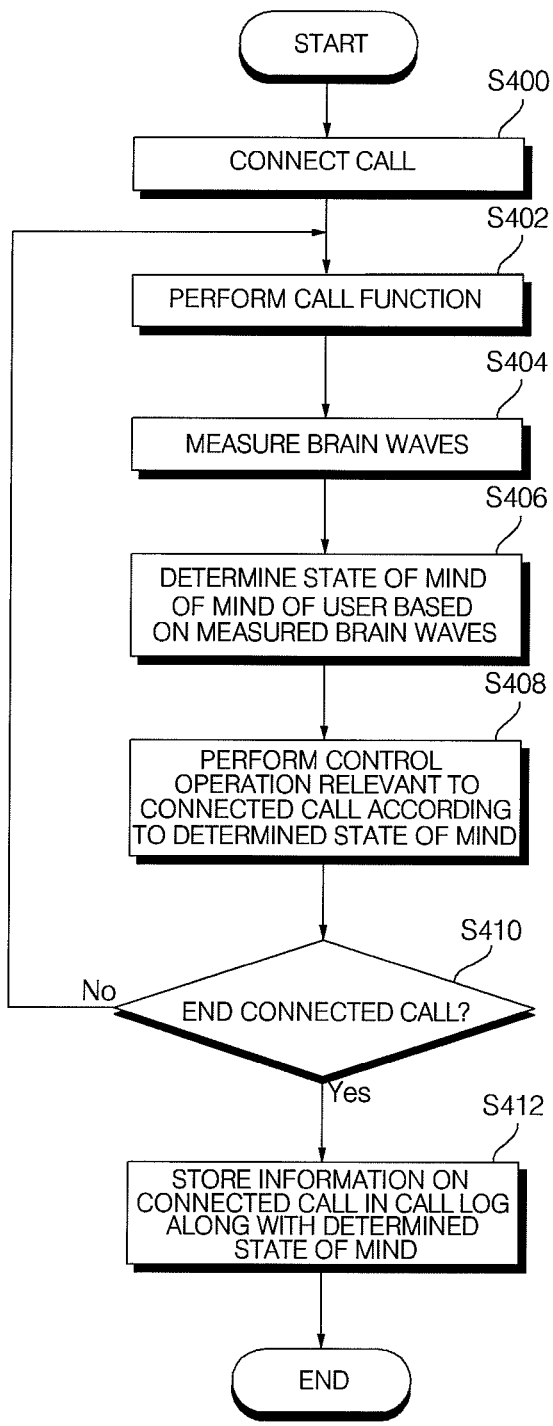
FIG. 10 is a flowchart illustrating a method of controlling the operation of a mobile terminal, according to an exemplary embodiment of the present invention.

FIG. 10 illustrates a method of controlling the operation of a mobile terminal, according to an exemplary embodiment of the present invention, and particularly, how to control a call operation according to the state of mind of a user. The method in this figure or in other figures herein is implemented by the mobile terminal 100 of FIG. 1, but can be implemented in another suitable device. Referring to FIG. 10, if a call request is issued by, for example, entering the phone number of another mobile terminal (hereinafter referred to as the counterpart mobile terminal) and pressing a 'call' icon, the controller 180 the mobile terminal 100 controls the wireless communication unit 110 to connect a call to the entered phone number (S400) and thus to perform a call function (S402).

During the call between the mobile terminal 100 and the counterpart mobile terminal 100, the controller 180 controls the brain wave sensor module 147 to measure the brain waves of the user of the mobile terminal 100 (S404), and determines the state of mind of the user of the mobile terminal 100 based on the measured brain waves (S406).

Thereafter, the controller 180 performs a control operation relevant to the call between the mobile terminal 100 and the counterpart mobile terminal according to the determined state of mind of the user of the mobile terminal 100 (S408). For example, the controller 180 can adjust the volume of sound or replace a current call screen with another call screen during the call between the mobile terminal 100 and the counterpart mobile terminal or can end the call between the mobile terminal 100 and the counterpart mobile terminal. The type of the control operation performed in operation S408 can vary according to the environment of the use of the mobile terminal 100 or the settings in the mobile terminal 100.

Operations S402 through S408 can be repeatedly performed until the user of the mobile terminal 100 chooses to end the call between the mobile terminal 100 and the counterpart mobile terminal (S410). Alternatively, operations S402 through S408 can be performed only once during a call. When the call between the mobile terminal 100 and the counterpart mobile terminal is ended, the controller 180 can store both the determined state of mind of the user of the mobile terminal 100 and information on the ended call in a call log (S412). Alternatively, controller 180 can store only one of the determined state of mind of the user of the mobile terminal 100 and information on the ended call in the call log. Other data related to the call can also be stored in the call log.

Information stored in the call log on the state of mind of the user of the mobile terminal 100 can be used for various purposes. For example, when an incoming call is received from the counterpart mobile terminal, an icon or information indicating the state of mind of the user of the counterpart mobile terminal can be displayed along with the phone number of the counterpart mobile terminal. In addition, an arbitrary calling function can be provided. Then, when the arbitrary calling function is selected, the user of the mobile terminal 100 can arbitrarily select one of the calls in a call history that are paired with an icon or information corresponding to a stress-relieved state of mind and can then issue a request for calling a phone number corresponding to the selected call.

According to this exemplary embodiment, it is possible to effectively control various call-related functions according to the state of mind of a user.

Figure 11:
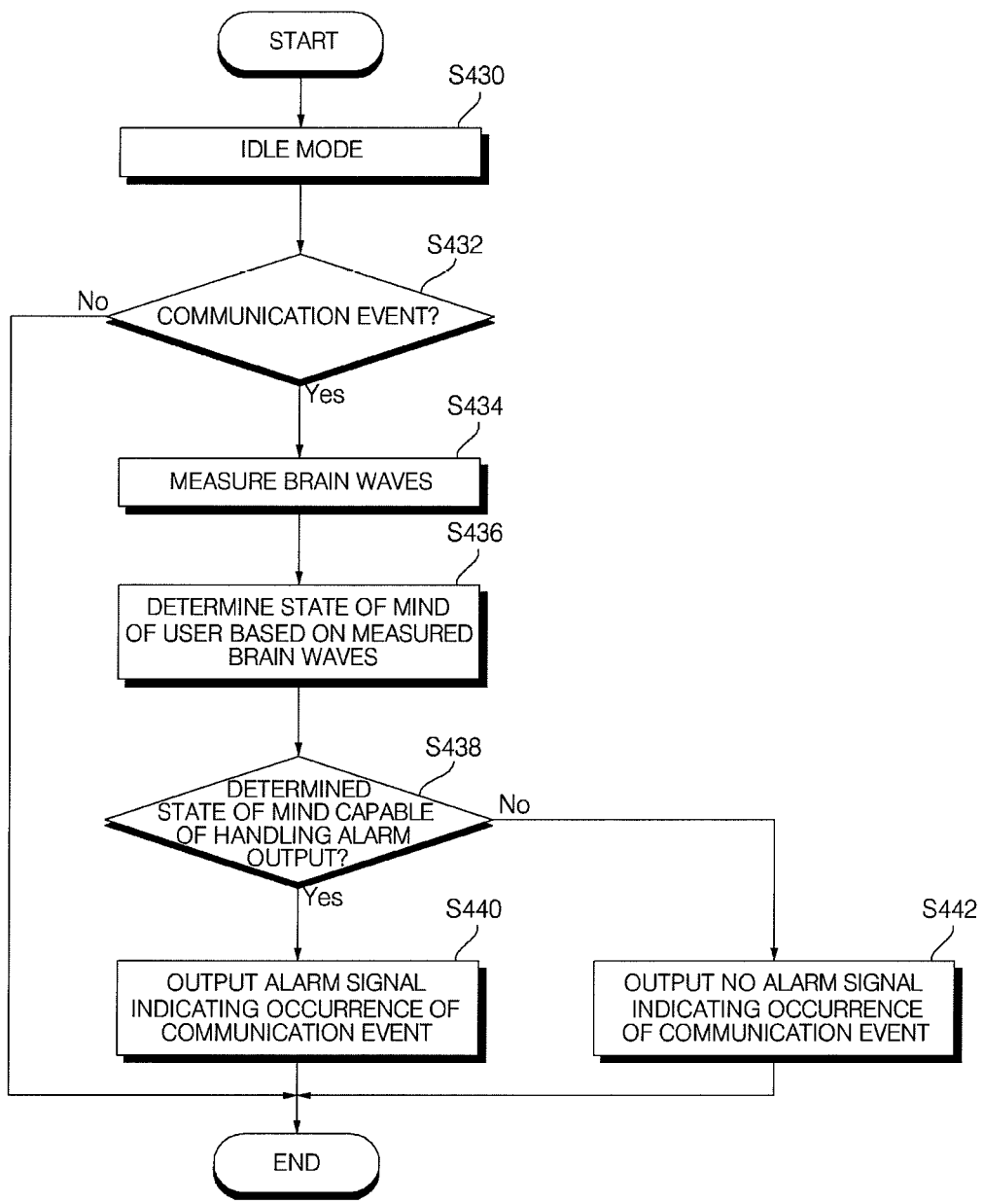
FIG. 11 is a flowchart illustrating a method of controlling the operation of a mobile terminal, according to another exemplary embodiment of the present invention.

FIG. 11 illustrates a method of controlling the operation of a mobile terminal, according to another exemplary embodiment of the present invention, and particularly, how to control the transmission or reception of messages or emails according to the state of mind of a user. Referring to FIG. 11, when the mobile terminal 100 is placed in an idle mode (S430), the controller 180 can determine whether a communication event such as an incoming call, an incoming message or an incoming email has occurred (S432).

Thereafter, if it is determined in operation S432 that a communication event has occurred, the controller 180 controls the brain wave sensor module 147 to measure the brain waves of a user (S434), and determines the state of mind of the user based on the frequency band of the measured brain waves (S436).

Thereafter, the controller 180 either outputs an alarm signal indicating the occurrence of a communication event (S440) or outputs no alarm signal (S442) according to the state of mind of the user. More specifically, if the results of the determination of the state of mind of the user indicate that the user is, for example, asleep, is concentrating on something or is excited, the controller 180 can stop the output of the alarm signal. On the other hand, if the results of the determination of the state of mind of the user indicate that the user is in his or her usual state of mind, the controller 180 can output the alarm signal.

According to this exemplary embodiment, it is possible to decide whether to output an alarm signal indicating the occurrence of a communication event according to the state of mind of a user. In addition, it is possible to send a message or email having inserted therein an icon indicating the state of mind of a user as a response to an incoming message or email.

Figure 12:
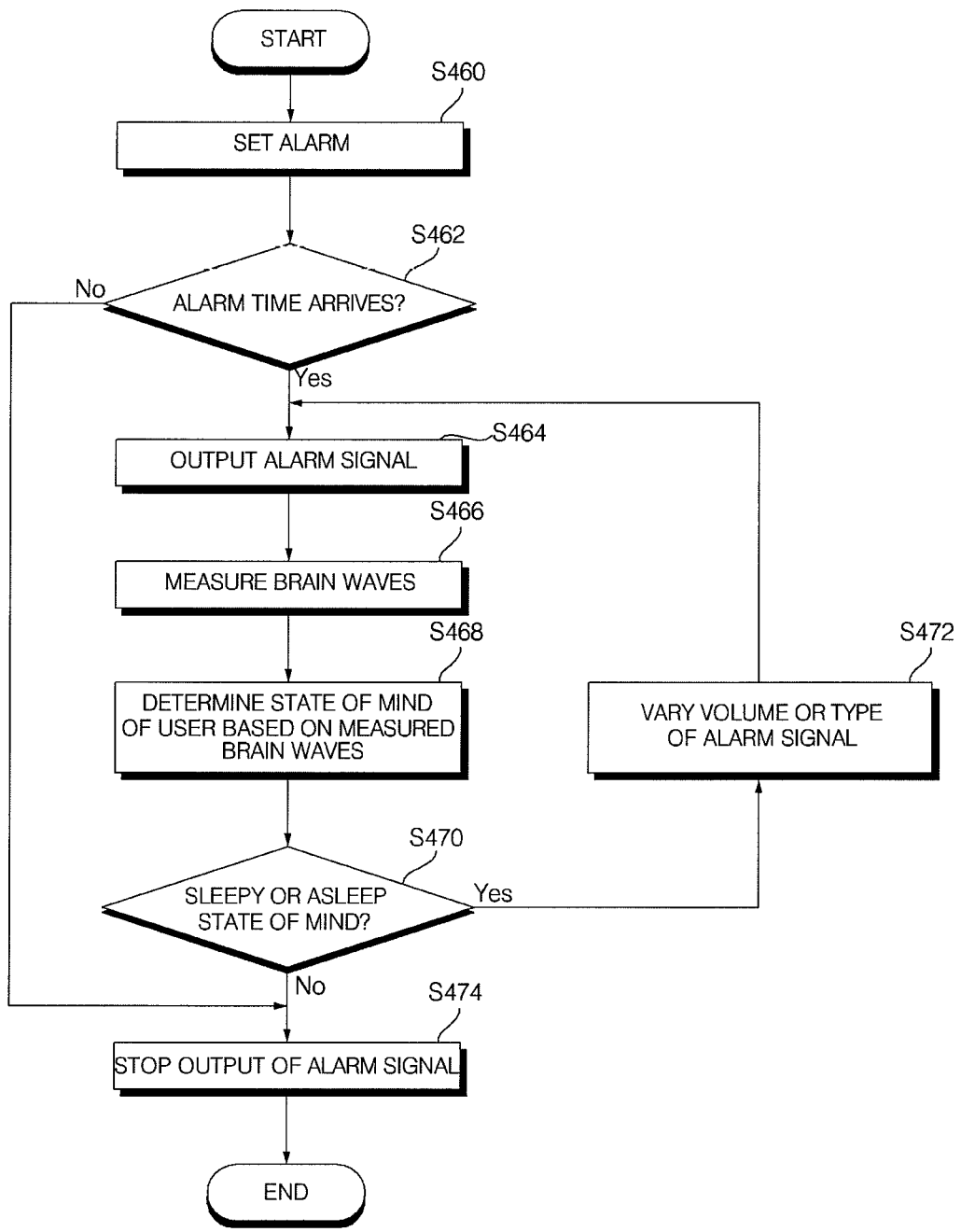
FIG. 12 is a flowchart illustrating a method of controlling the operation of a mobile terminal, according to another exemplary embodiment of the present invention.

FIG. 12 illustrates a method of controlling the operation of a mobile terminal, according to another exemplary embodiment of the present invention, and particularly, how to control an alarm function according to the state of mind of a user. Referring to FIG. 12, when an alarm is set by entering alarm information such as an alarm time and pattern (S460), the controller 180 periodically determines whether the alarm time has arrived (S462). If it is determined in operation S462 that the alarm time has arrived, the controller 180 controls a predefined alarm signal to be output according to the alarm information (S464).

Thereafter, the controller 180 controls the brain wave sensor module 147 to measure the brain waves of a user (S466), and determines the state of mind of the user based on the frequency band of the measured brain waves (S468).

If the results of the determination of the state of mind of the user indicate that the user is sleepy or asleep (S470), the controller 180 increases the volume of the predefined alarm signal or outputs another alarm signal, instead of or in addition to the predefined alarm signal (S472), and the method returns to operation S464. For example, when the user is sleepy or asleep, the controller 180 increases the volume of the predefined alarm signal or outputs a vibration signal or an optical signal along with the predefined alarm signal.

On the other hand, if the results of the determination of the state of mind of the user indicate that the user is neither sleepy nor asleep (S470), the controller 180 stops the output of the predefined alarm signal (S474).

According to this exemplary embodiment, it is possible to control the output or pattern of an alarm signal according to the state of mind of a user.

Various operations performed by the mobile terminal 100, such as a multimedia player function, a GPS navigation function, or a short-range communication function can be effectively controlled according to the state of mind of a user, and this will be described later in further detail with reference to FIGS. 19(a) through 22(b).

The exemplary embodiments of FIGS. 10 through 12 and other exemplary embodiments of the present invention will hereinafter be described in further detail with reference to FIGS. 13 through 22(b).

More specifically, the exemplary embodiment of FIG. 10 will hereinafter be described in further detail with reference to FIGS. 13 through 15(b).

Figure 13:
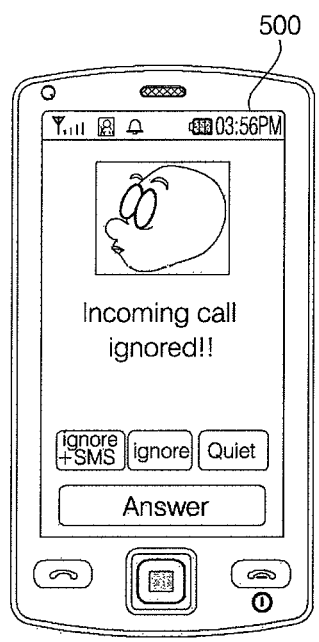

FIG. 13 illustrates a display screen 500 that can be displayed on the display module 151 when a call is automatically terminated according to the state of mind of a user. Referring to FIG. 13, if, during the call, the user is determined to be sleepy or asleep and no audio signal is input to the microphone 123 for more than a predefined amount of time, the controller 180 controls the haptic module 157 to generate vibration for a predetermined time period and increases the volume of the call. If the state of mind of the user still does not change afterwards, a message indicating that the user is no longer available is sent to the other person on the phone, and then, the call is automatically terminated.

Figure 14:
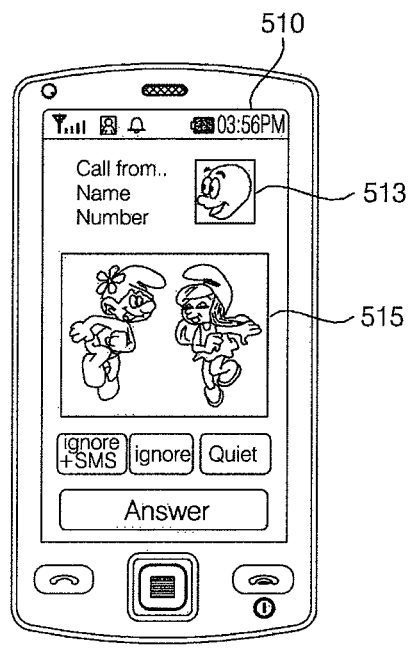
Figure 15:
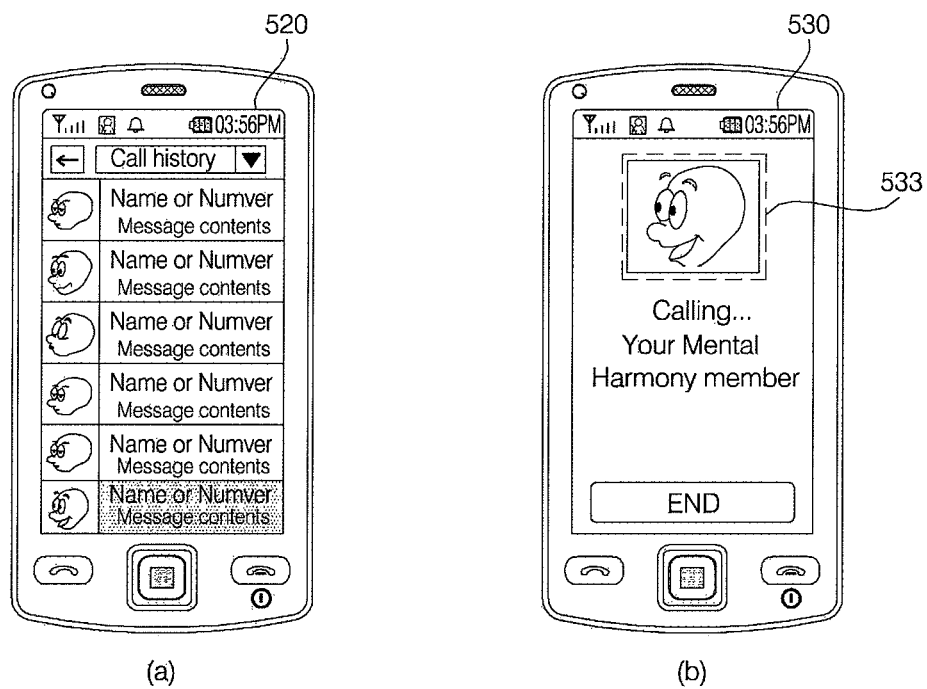

FIG. 14 illustrates a display screen 510 that can be displayed on the display module 151 during a call and can reflect the state of mind of a user. Referring to FIG. 14, during a call, a display screen 510 indicating the state of mind or feeling of the user such as excitement or joy can be displayed. An icon 513 or an image 515 indicating the state of mind or feeling of the user can be additionally displayed on the display screen 510, and the volume of the call can be increased.

When the user appears to be distracted during the call, the pitch of the voice of the other person on the phone can be altered into a funny voice, or the volume of the call can be lowered.

FIG. 15(a) illustrates a 'call history' screen 520 showing a plurality of calls made or received by the mobile terminal 100. Referring to FIG. 15(a), each of the calls listed on the 'call history' screen is paired with an icon or information indicating the state of mind of a user at the time when a corresponding call was made or received. When a request for calling a phone number corresponding to one of the calls listed on the 'call history' screen is received, an icon indicating the state of mind of the user at the time when the selected call was made or received and other information on the selected call can be displayed on the display module 151.

FIG. 15(b) illustrates a display screen 530 that can be displayed on the display module 151 when an 'arbitrary calling' request is issued. Referring to FIG. 15(b), when the 'arbitrary calling' request is issued, the controller 180 calls a phone number or contact arbitrarily selected from a group of callers or callees listed in a call log or a contacts list and paired with an icon or information corresponding to a determined state of mind. Then, an icon 533 indicating the state of mind of the user at the time when a previous call was made or received from the selected phone number or contact can be displayed on the display screen 530. In short, when an 'arbitrary calling' function is selected, it is possible to arbitrarily select a phone number or contact to call with reference to information included in a call history or a contact's list on the state of mind of a user at the time when a previous call was made to or received from the selected phone number or contact.

Figure 16:
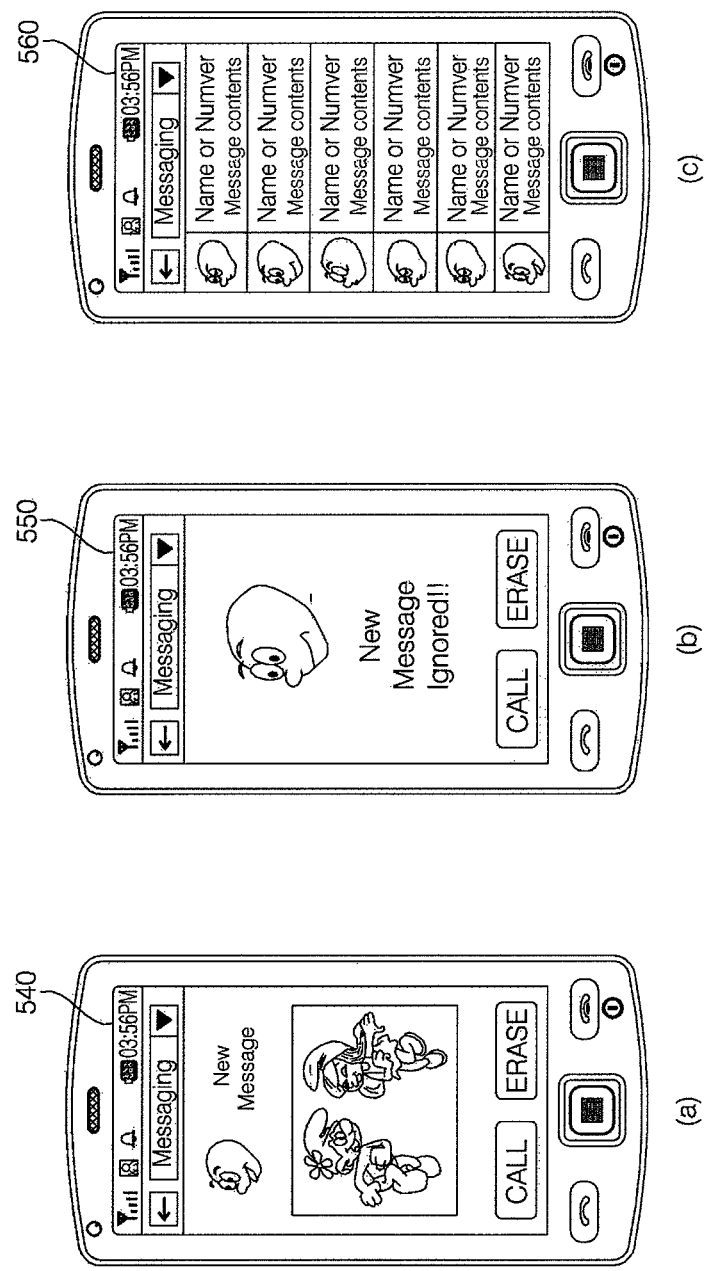

The exemplary embodiment of FIG. 11 will hereinafter be described in further detail with reference to FIGS. 16(a) through 17.

FIG. 16(a) illustrates a display screen 540 that can be displayed on the display module 151 upon the receipt of an incoming message when a user is in his or her usual state of mind. Referring to FIG. 16(a), if the user is in his usual state of mind, an alarm signal can be output upon the receipt of an incoming message or call, and a display screen relevant to the receipt of the incoming message or call can be displayed on the display module 151.

On the other hand, if the user is not in his or her usual state of mind, for example, when the user is excited, the incoming message or call is ignored, and a display screen 550 relevant to the ignoring of the incoming message or call can be displayed on the display module 151, as shown in FIG. 16(b). That is, it is possible to accept or ignore an incoming short message service (SMS) or multimedia messaging service (MMS) message or an incoming email according to the state of mind of a user.

FIG. 16(c) illustrates a message inbox screen 560 that can be displayed on the display module 151. Referring to FIG. 16(c), each message listed on the inbox screen 560 is paired with an icon indicating the state of mind of a user at the time when a corresponding message was received. That is, each incoming message can be stored in a message inbox along with the state of mind of a user at the time when a corresponding message was received.

Figure 17:
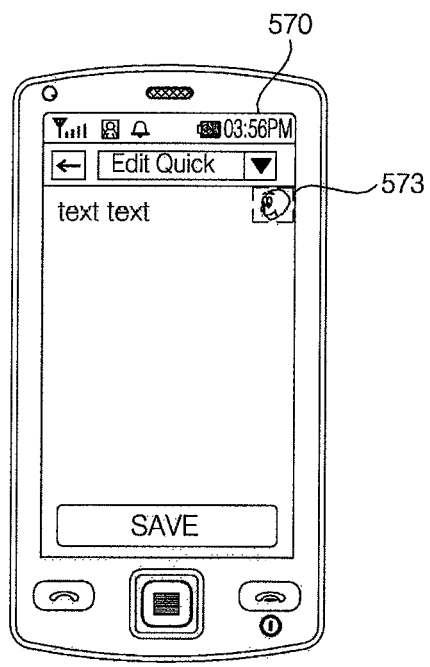
Figure 18:
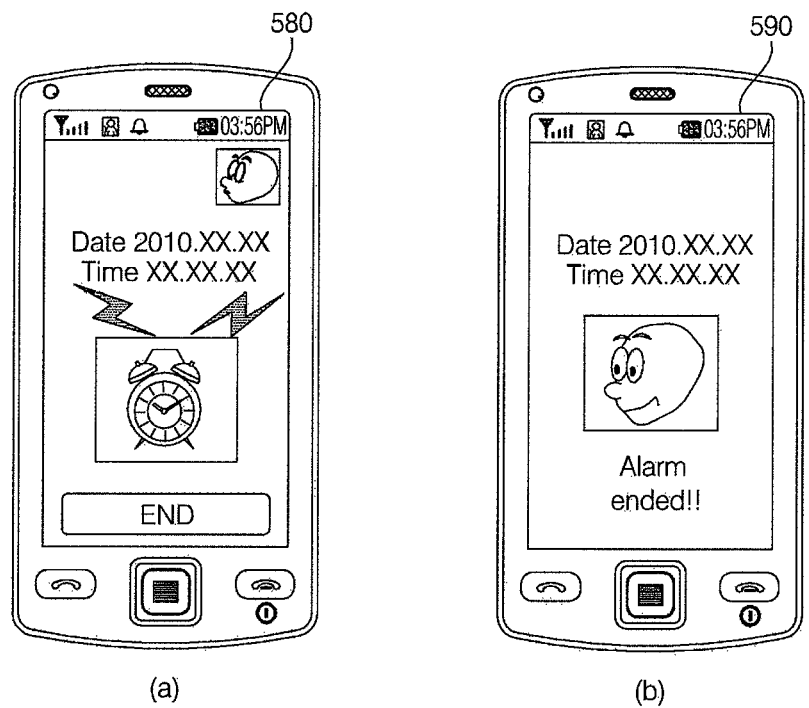
FIGS. 18(a) and 18(b) are diagrams illustrating the exemplary embodiment of FIG. 12.

FIG. 17 illustrates a 'new message' screen 570 that can be displayed on the display module 151. Referring to FIG. 17, an icon 573 indicating the state of mind of a user when writing a new SMS or MMS message or a new email can be displayed on the 'new message' screen 570. When the writing of the new SMS or MMS message or the new email is complete, the written message or email can be sent along with the icon 573.

The exemplary embodiment of FIG. 12 will hereinafter be described in further detail with reference to FIGS. 18(a)-18(b).

FIG. 18(a) illustrates a display screen 560 that can be displayed on the display module 151 upon the arrival of a predefined alarm time. Referring to FIG. 18(a), when the predefined alarm time arrives, the display screen 560 can be displayed on the display module 151, and an alarm sound can be output. In this case, if a user is sleepy or asleep, the volume of the alarm sound can be maximized, or the alarm sound can be output along with vibration until the user is awaken from sleep. On the other hand, if the user is neither sleepy nor asleep, the output of the alarm sound can be stopped, and a display screen 590 showing a message that says "alarm ended" can be displayed on the display module 151, as shown in FIG. 18(b).

Figure 19:
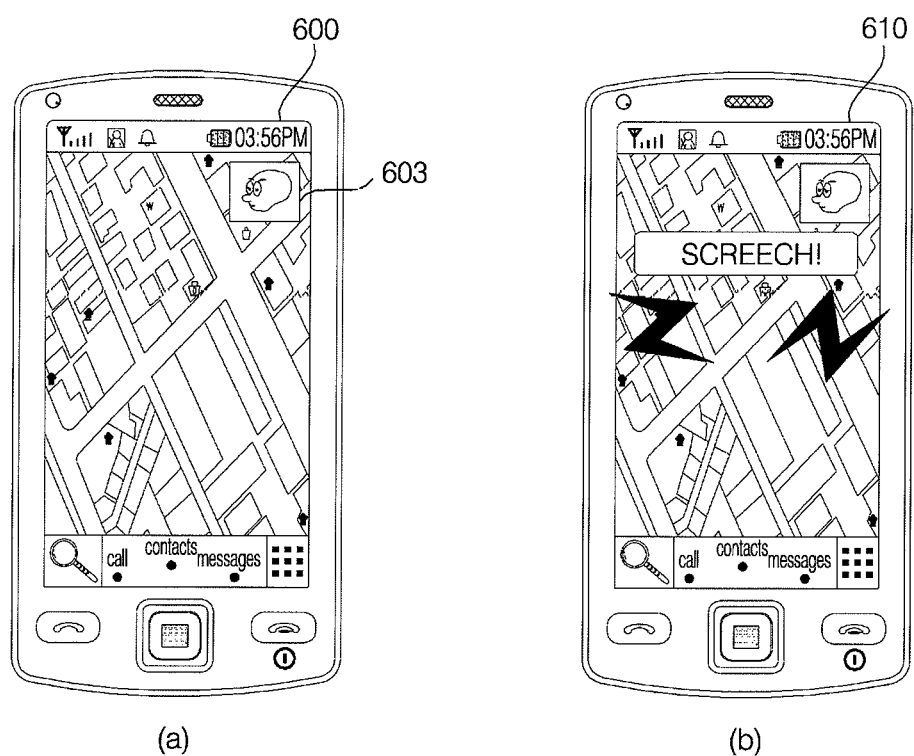
Figure 20:
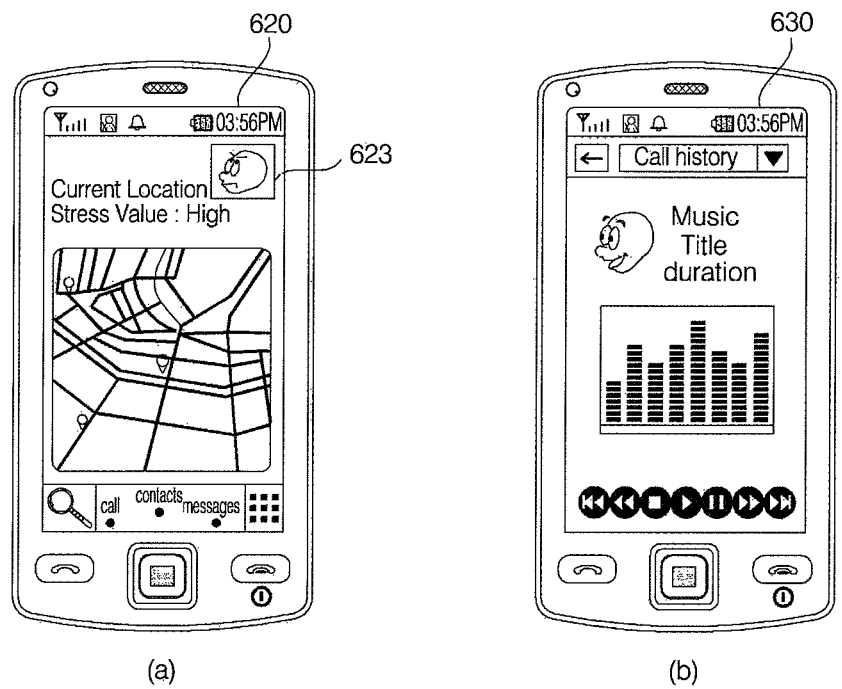
Figure 21:
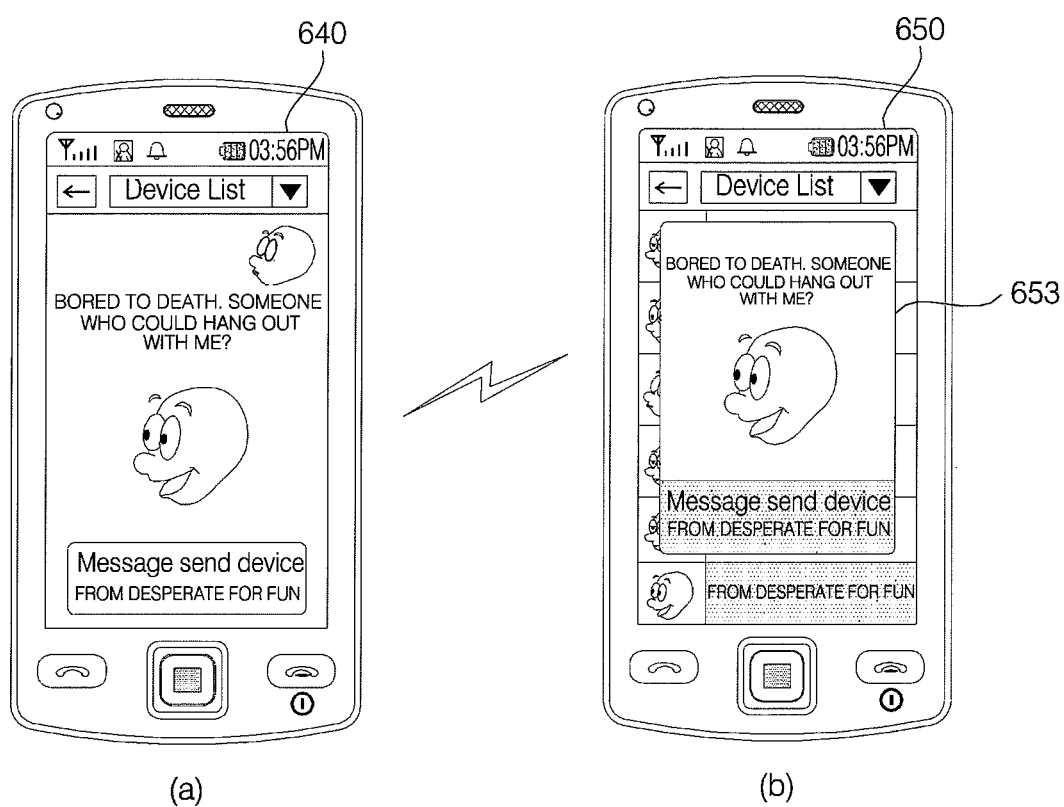
FIGS. 21(a) and 21(b) are diagrams illustrating how to control a short-range communication function according to the state of mind of a user according to an embodiment of the invention.
Figure 22:
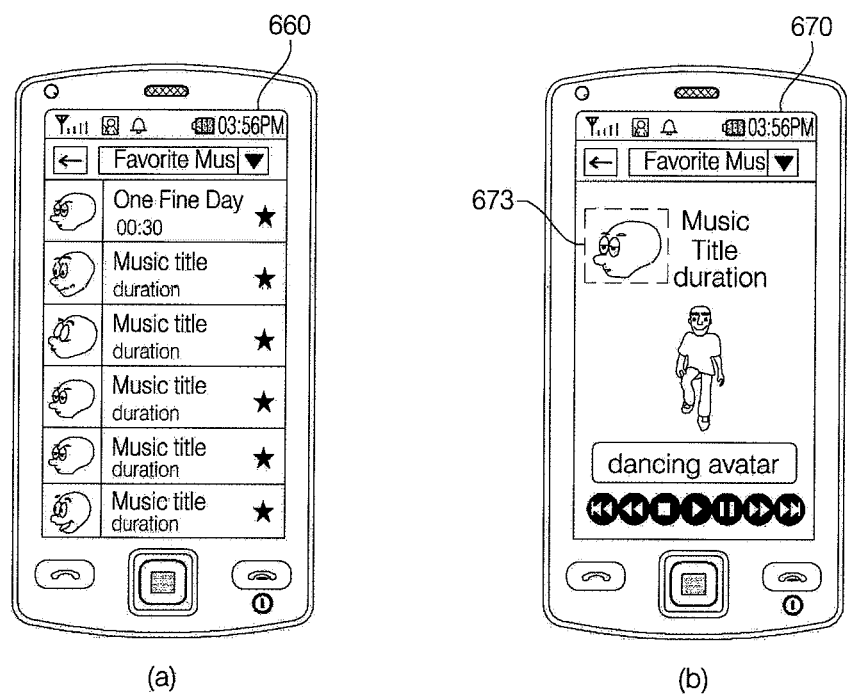
FIGS. 22(a) and 22(b) are diagrams illustrating how to control a multimedia player function according to the state of mind of a user according to an embodiment of the invention.

FIGS. 19(a) through 20(b) illustrate how to control a navigation function according to the state of mind of a user. Referring to FIG. 19(a), an icon 603 indicating the state of mind of a user can be displayed on a GPS navigation screen 600 that can be displayed on the display module 151. Then, if the user is determined to be about to fall asleep while driving, a screeching sound can be output, and a visual representation of the screeching sound, or another sound or visual effect, can be displayed on a GPS navigation screen 610, as shown in FIG. 19(b).

If the user is not in his or her usual state of mind when the GPS navigation screen 600 is displayed, a radio or music player of the mobile terminal 100 can be turned on.

Referring to FIG. 20(a), previously visited locations where a user has been measured as feeling stressful can be recorded. Then, when the user revisits one of the locations, an icon 623 corresponding to a stressful state of mind can be displayed on a display screen 620 on the display module 151. Afterwards, a multimedia player screen 630 can be displayed as shown in FIG. 20(b), instead of the display screen 620, and music that can relieve stress can be automatically played.

A number of locations where the user feels excitement or joy can be recorded along with display screens or operations displayed or performed by the mobile terminal 100 at the time of the user's visit to the locations. Then, when the user revisits one of the locations, the display screen or the operation that was displayed or performed by the mobile terminal 100 at the time of the user's first visit to the revisited location can be restored. Accordingly, when a user visits a new place, the state of mind of the user can be determined and recorded for a later use when the user revisits the new place.

FIGS. 21(a)-21(b) illustrate how to control a short-range communication function according to the state of mind of a user according to an embodiment of the invention. Referring to FIG. 21(a), when a request for searching for or connecting the mobile terminal to an external device that can communicate with the mobile terminal 100 via short-range communication such a Bluetooth, or another form of communication, is received from a user, a display screen 640 can be displayed on the display module 151. The mobile terminal 100 can be listed in a list of external devices that can communicate via short-range communication in a name reflecting the state of mind of the user, or a message indicating the state of mind of the user can be displayed on the display screen 640. In addition, an image 653 indicating the state of mind of the user can be displayed on a display screen 650 showing the list of external devices that can communicate via short-range communication, as shown in FIG. 21(b).

FIGS. 22(a)-22(b) illustrates how to control a multimedia player function according to the state of mind of a user according to an embodiment of the invention. Referring to FIG. 22(a), a play list screen 660 showing a plurality of music files can be displayed on the display module 151. Each of the music files is paired with an icon indicating the state of mind of a user at the time when the user listened to a corresponding music file. Thus, the user can effectively classify the music files and select one of the music files to listen to.

Referring to FIG. 22(b), an icon 673 indicating the state of mind of a user can be displayed on a multimedia player screen 670 on the display module 151. A music file can be automatically selected and played on the multimedia player screen 670 according to the state of mind of the user. In addition, the volume of a current music file can be automatically adjusted, or various sound effects can be automatically applied to the current music file according to the state of mind of the user.

The mobile terminal according to the present invention and the method of controlling the operation of the mobile terminal according to the present invention are not restricted to the exemplary embodiments set forth herein. Therefore, variations and combinations of the exemplary embodiments set forth herein may fall within the scope of the present invention.

The embodiments of the present invention can be realized as code that can be read by a processor included in or downloaded to a mobile terminal and that can be written on one or more computer-readable recording media. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to embodiments of the present invention, it is possible to determine the state of mind of a user based on brain wave measurements obtained from the user and use the results of the determination to control various functions performed by a mobile terminal such as a call-related operation, an alarm function or a communication event function. Therefore, it is possible to effectively control the operation of the mobile terminal according to the state of mind of the user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling the operation of a mobile terminal, the method comprising:

establishing, via the mobile terminal, a call between the mobile terminal and a counterpart mobile terminal by displaying information corresponding to a state of mind of the user based on a frequency band determined during a previous call between the mobile terminal and the counterpart mobile terminal;

retractably extending at least one brain wave sensor from the mobile terminal and bending the at least one brain wave sensor for attaching onto the head of a user;

measuring, via the retractably extended at least one brain wave sensor, at least one brain wave of the user during the established call only after determining an occurrence of an incoming call corresponding to the established call;

determining a frequency band to which the measured at least one brain wave of the user by the retractably extended at least one brain wave sensor associated with the mobile terminal belongs;

identifying a state of mind of the user based on the determined frequency band;

performing, via the mobile terminal, a control operation relevant to the call according to the state of mind of the user based on the determined frequency band, the control operation relevant to the call being performed only after the at least one brain wave is measured during the established call,
wherein the performed control operation relevant to the call includes at least one of:
  varying a call screen associated with the call, and
  displaying an icon corresponding to the state of mind of the user based on the determined frequency band;
terminating the call; and
storing information on the call in a call log along with the state of mind of the user based on the determined frequency band.

2. A mobile terminal, comprising:
a memory;
a wireless communication unit configured to establish a call between the mobile terminal and a counterpart mobile terminal by displaying information corresponding to a state of mind of the user based on a frequency band determined during a previous call between the mobile terminal and the counterpart mobile terminal;
at least one first brain wave sensor configured to retractably extend from the mobile terminal, bend for attaching onto a head of a user, and measure at least one brain wave of the user during the established call only after determining an occurrence of an incoming call corresponding to the established call; and
a controller configured to:
  determine a frequency band to which the measured at least one brain wave of the user by the retractably extended at least one brain wave sensor associated with the mobile terminal belongs,
  identify a state of mind of the user based on the determined frequency band, and
  perform a control operation relevant to the call according to the state of mind of the user based on the determined frequency band, the control operation relevant to the call being performed only after the at least one brain wave is measured during the established call,
wherein, when the control operation relevant to the call is performed, the controller is further configured to, at least one of:
  vary a call screen associated with the call, and
  display an icon corresponding to the state of mind of the user based on the determined frequency band, and
wherein the controller is further configured to:
  terminate the call, and
  control the memory to store information on the call in a call log along with the state of mind of the user based on the determined frequency band.

3. A method of controlling the operation of a mobile terminal, the method comprising:
setting, via the mobile terminal, an alarm according to an alarm signal;
determining, via the mobile terminal, user states including a sleep state, a normal state, and an excited state;
establishing, via the mobile terminal, a call between the mobile terminal and a counterpart mobile terminal by displaying information corresponding to a state of mind of the user based on a frequency band determined during a previous call between the mobile terminal and the counterpart mobile terminal;
measuring, via at least one brain wave sensor, at least one brain wave of the user during the established call only after determining an occurrence of an incoming call corresponding to the established call;
determining a frequency band to which the measured at least one brain wave of the user by the at least one brain wave frequency sensor associated with the mobile terminal belongs;
identifying the user state according to a state of mind of the user based on the determined frequency band;
outputting, via an output unit, the alarm signal to activate the alarm when the determined frequency band corresponds to a first value or a range of first values associated with the user state being identified as the normal state;
outputting, by the output unit, no alarm signal when the determined frequency band corresponds to a second value or a range of second values associated with the user state being identified as the sleep state or the excited state;
performing, via the mobile terminal, a control operation relevant to the call according to the state of mind of the user based on the determined frequency band, the control operation relevant to the call being performed only after the at least one brain wave is measured during the established call,
wherein the performed control operation relevant to the call includes at least one of:
  varying a call screen associated with the call, and
  displaying an icon corresponding to the state of mind of the user based on the determined frequency band;
terminating the call; and
storing information on the call in a call to along with the state of mind of the user based on the determined frequency band.

4. The method of claim 3, further comprising:
stopping, by the mobile terminal, the output of the alarm signal when the determined frequency band corresponds to a value different from the first value or the range of first values.

5. A mobile terminal, comprising:
a memory;
an output unit configured to output an alarm signal;
a wireless communication unit configured to establish a call between the mobile terminal and a counterpart mobile terminal by displaying information corresponding to a state of mind of the user based on a frequency band determined during a previous call between the mobile terminal and the counterpart mobile terminal;
at least one brain wave sensor configured to measure at least one brain wave of the user during the established call only after determining an occurrence of an incoming call corresponding to the established call; and
a controller configured to:
  set an alarm according to the alarm signal,
  determine user states including a sleep state, a normal state, and an excited state,
  determine a frequency band to which the measured at least one brain wave of the user by the at least one brain wave sensor associated with the mobile terminal belongs,
  identify the user state according to a state of mind of the user based on the determined frequency hand,
  control the output unit to output the alarm signal to activate the alarm when the determined frequency band corresponds to a first value or a range of first values associated with the user state being identified as the normal state,
  control the output unit to output no alarm signal when the determined frequency band corresponds to a second value or a range of second values associated with the user state being identified as the sleep state or the excited state, and perform a control operation relevant to the call according to the state of mind of the user based on the determined frequency band, the control operation relevant to the call being performed only after the at least one brain wave is measured during the established call, wherein, when the control operation relevant to the call is performed, the controller is further configured to, at least one of:

vary a call screen associated with the call, and display an icon corresponding to the state of mind of the user based on the determined frequency band, and wherein the controller is further configured to:

terminate the call, and control the memory to store information on the call in a call log along with the state of mind of the user based on the determined frequency band.

6. The mobile terminal of claim 5, wherein the controller is configured to stop the output of the alarm signal when the determined frequency band corresponds to a value different from the first value or the range of first values.

7. A method of controlling the operation of a mobile terminal, the method comprising:

establishing, via the mobile terminal, a call between the mobile terminal and a counterpart mobile terminal;

measuring, via the at least one brain wave sensor, at least one brain wave of the user during the established call only after determining an occurrence of an incoming call corresponding to the established call;

determining a frequency band to which the measured receiving at least one brain wave of the user by the at least one brain wave sensor associated with the mobile terminal belongs;

storing the determined frequency band in a memory;

identifying a state of mind of the user based on the determined frequency band;

performing, via the mobile terminal, a control operation relevant to the call according to the state of mind of the user based on the determined frequency band, the control operation relevant to the call being performed only after the at least one brain wave is measured during the established call, wherein the performed control operation relevant to the call includes at least one of:

varying a call screen associated with the call, and displaying an icon corresponding to the state of mind of the user based on the determined frequency band;

terminating the call;

measuring, via the at least one brain wave sensor, at least one additional brain wave of the user after the terminating of the call;

determining an additional frequency band to which the measured at least one additional brain wave of the user by the at least one brain wave sensor associated with the mobile terminal belongs;

comparing the determined additional frequency band to the stored frequency band of the user determined during the established call with at least one additional counterpart mobile terminal to generate a comparison result; and arbitrarily calling one of the at least one additional counterpart mobile terminal based on the comparison result.

8. A mobile terminal, comprising:

a wireless communication unit configured to establish a call between the mobile terminal and a counterpart mobile terminal;

at least one first brain wave sensor configured to measure at least one brain wave of the user during the established call only after determining an occurrence of an incoming call corresponding to the established call; and a controller configured to:

determine a frequency band to which the measured at least one brain wave of the user by the at least one brain wave sensor associated with the mobile terminal belongs, control a memory to store the determined frequency band, identify a state of mind of the user based on the determined frequency band, and perform a control operation relevant to the call according to the state of mind of the user based on the determined frequency band, the control operation relevant to the call being performed only after the at least one brain wave is measured during the established call, wherein, when the control operation relevant to the call is performed, the controller is further configured to, at least one of:

vary a call screen associated with the call, and display an icon corresponding to the state of mind of the user based on the determined frequency band, and wherein the controller is further configured to:

terminate the call, receive measure, via the at least one brain wave sensor, at least one additional brain wave of the user, determine an additional frequency band to which the measured at least one additional brain wave of the user by the at least one brain wave sensor associated with the mobile terminal belongs, compare the determined additional frequency band to the stored frequency band of the user determined during the established call with at least one additional counterpart mobile terminal to generate a comparison result, and arbitrarily call one of the at least one additional counterpart mobile terminal based on the comparison result.

* * * * *